(12) United States Patent
Enumula et al.

(10) Patent No.: US 11,663,490 B1
(45) Date of Patent: May 30, 2023

(54) PARTIAL SUM PRE-COMPUTATION TO IMPLEMENT QUANTIZED NEURAL NETWORKS ON PROGRAMMABLE DEVICES

(71) Applicant: XILINX, INC., San Jose, CA (US)

(72) Inventors: Vijay Kumar Reddy Enumula, Hyderabad (IN); Sundeep Ram Gopal Agarwal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 875 days.

(21) Appl. No.: 16/600,254

(22) Filed: Oct. 11, 2019

(51) Int. Cl.
*G06N 3/10* (2006.01)
*G06N 3/08* (2023.01)
*G06F 7/544* (2006.01)

(52) U.S. Cl.
CPC .............. *G06N 3/10* (2013.01); *G06F 7/5443* (2013.01); *G06N 3/08* (2013.01)

(58) Field of Classification Search
CPC ........... G06N 3/10; G06N 3/08; G06F 7/5443
See application file for complete search history.

(56) References Cited

U.S. PATENT DOCUMENTS

| 9,823,968 | B1* | 11/2017 | Fugini | G06F 3/0689 |
| 11,182,666 | B1* | 11/2021 | Phebus | G06N 3/063 |
| 2016/0203790 | A1* | 7/2016 | Taylor | G09G 5/363 |
| | | | | 345/601 |
| 2020/0073636 | A1* | 3/2020 | Cammarota | G06N 3/04 |
| 2021/0303984 | A1* | 9/2021 | Lan | G06N 5/04 |

OTHER PUBLICATIONS

Umuroglu, Y. et al., "FINN: A Framework for Fast, Scalable Binarized Neural Network Inference," International Symposium on Field Progammable Gate Arrays, Feb. 2017.
Boutros, A. et al., "Embracing Diversity: Enhanced DSP Blocks for Low-Precision Deep Learning on FPGAs," 28th International Conference on FPGAs, 2018.
Fu, Y. et al., "Deep Learning with INT8 Optimizations on Xilinx Devices," White Paper, Apr. 2017.

* cited by examiner

*Primary Examiner* — Ajay Ojha
(74) *Attorney, Agent, or Firm* — Patterson + Sheridan, LLP

(57) ABSTRACT

An example method of implementing a quantized neural network (QNN) for a programmable device includes: identifying multiply-accumulate operations of neurons in the QNN; converting the multiply-accumulate operations to memory lookup operations; and implementing the memory lookup operations using a pre-compute circuit for the programmable device, the pre-compute circuit storing a pre-computed output of a neuron in the QNN for each of the memory lookup operations.

20 Claims, 9 Drawing Sheets

PARTIAL SUM PRE-COMPUTATION TO IMPLEMENT QUANTIZED NEURAL NETWORKS ON PROGRAMMABLE DEVICES

TECHNICAL FIELD

Examples of the present disclosure generally relate to neural networks and, in particular, to partial sum pre-computation to implement quantized neural networks on programmable devices.

BACKGROUND

Convolutional neural networks (CNNs) are computationally intensive, mostly with floating point multiply-accumulate (MAC) operations between input image samples and weights obtained from training. Research shows that quantization of image samples and weights allow for less complex MAC operations while achieving comparable accuracies compared to floating point networks. Among quantized neural networks (QNNs), binary neural networks (BNNs) are most popular as they reduce MAC operations to exclusive NOR (XNOR) and population count operations, which increases the peak operations per second that can be achieved on a device. However, with higher quantization than binary, XNOR operations do not work and the resource count increases significantly to implement the network. Thus, there it is desirable to efficiently implement QNNs in programmable devices, such as field programmable gate arrays (FPGAs), in order to consume fewer resources.

SUMMARY

Techniques for partial sum pre-computation to implement quantized neural networks on programmable devices are described. In an example, a method of implementing a quantized neural network (QNN) for a programmable device includes: identifying multiply-accumulate operations of neurons in the QNN; converting the multiply-accumulate operations to memory lookup operations; and implementing the memory lookup operations using a pre-compute circuit for the programmable device, the pre-compute circuit storing a pre-computed output of a neuron in the QNN for each of the memory lookup operations.

In another example, a non-transitory computer readable medium having instructions stored thereon that when executed by a processor cause the processor to perform a method of implementing a quantized neural network (QNN) for a programmable device, comprising: identifying multiply-accumulate operations of neurons in the QNN; converting the multiply-accumulate operations to memory lookup operations; and implementing the memory lookup operations using a pre-compute circuit for the programmable device, the pre-compute circuit storing a pre-computed output of a neuron in the QNN for each of the memory lookup operations.

In another example, a computer system includes: a memory configured to store code; and a processor configured to execute the code stored in the memory to implement a quantized neural network (QNN) for a programmable device by: identifying multiply-accumulate operations of neurons in the QNN; converting the multiply-accumulate operations to memory lookup operations; and implementing the memory lookup operations using a pre-compute circuit for the programmable device, the pre-compute circuit storing a pre-computed output of a neuron in the QNN for each of the memory lookup operations.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
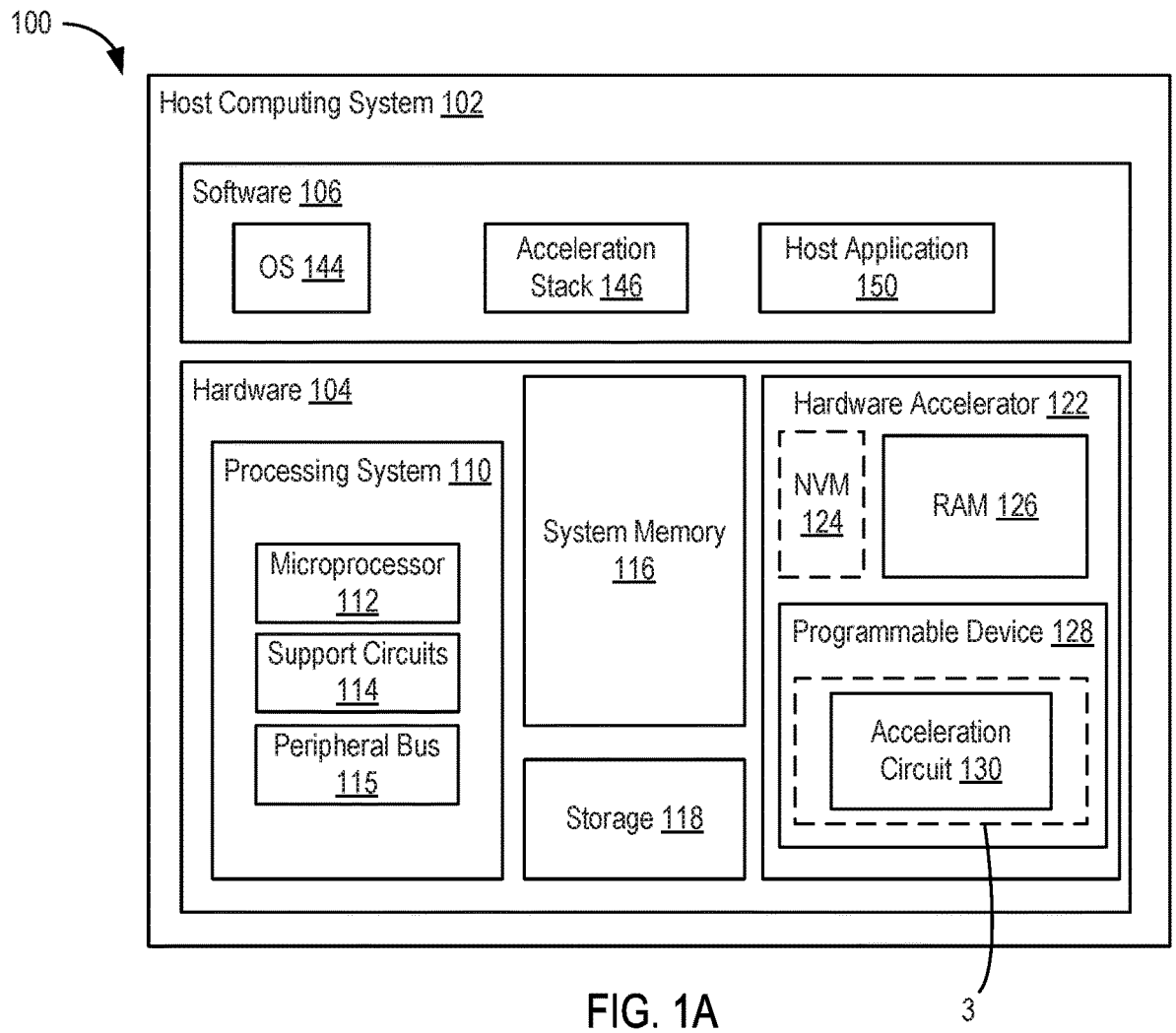
FIG. 1A is a block diagram depicting a hardware acceleration system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for partial sum pre-computation to implement quantized neural networks on programmable devices are described. The techniques can be used to efficiently implement QNNs on programmable devices, such as FPGAs, resulting in fewer compute resources and fewer operations. The techniques achieve higher throughputs for a given network compared to existing techniques by reducing MAC operations to memory lookups by pre-computing and storing results in memory for all combinations of inputs. These and other aspects are described below with respect to the drawings.

FIG. 1A is a block diagram depicting a hardware acceleration system 100 according to an example. The hardware acceleration system 100 includes a host computing system 102. The host computing system 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, an acceleration stack 146, a host application 150, and competing threads 139.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a basic input-output system (BIOS)), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SOC), or the like, which absorbs all or a substantial portion of the functionality of the chipset (e.g., north bridge, south bridge, etc.). The peripheral bus 115 can implement an expansion bus standard, such as Peripheral Component Interconnect Express (PCIe) or the like.

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

In an example, the hardware accelerator 122 includes a programmable device 128 and RAM 126. The hardware accelerator 122 can optionally include a non-volatile memory (NVM) 124. The programmable device 128 can be a field programmable gate array (FPGA) or an SOC having FPGA programmable logic along with other embedded subsystems. The NVM 124 can include any type of non-volatile memory, such as flash memory or the like. The RAM 126 can include DDR DRAM or the like. The RAM 126 can be organized into discrete RAM banks 127, as described further below. The programmable device 128 is coupled to the NVM 124 and the RAM 126. The programmable device 128 is also coupled to the peripheral bus 115 of the processing system 110.

The OS 144 can be any commodity operating system known in the art, such as such as Linux®, Microsoft Windows®, Mac OS®, or the like. The acceleration stack 146 includes drivers and libraries that provide application programming interfaces (APIs) to the hardware accelerator 122 for command and control thereof.

Figure 1B:
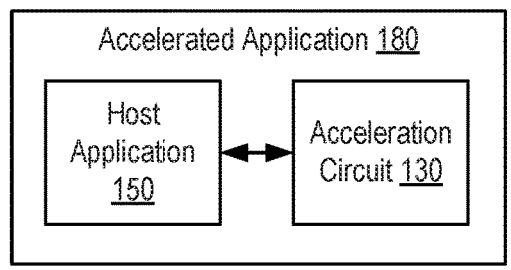
FIG. 1B is a block diagram depicting an accelerated application according to an example.

FIG. 1B is a block diagram depicting an accelerated application 180 according to an example. The accelerated application 180 includes the host application 150 and an acceleration circuit 130. The acceleration circuit 130 is programmed in programmable logic (PL) 3 of the programmable device 128 on the hardware accelerator 122. The host application 150 includes software executing on the microprocessor 112 that invokes the acceleration circuit 130 using API calls to the acceleration stack 146 to perform some work. The host application 150 can include neural network, video processing, network processing, or the like type applications that offload some functions to the hardware accelerator 122.

Figure 2:
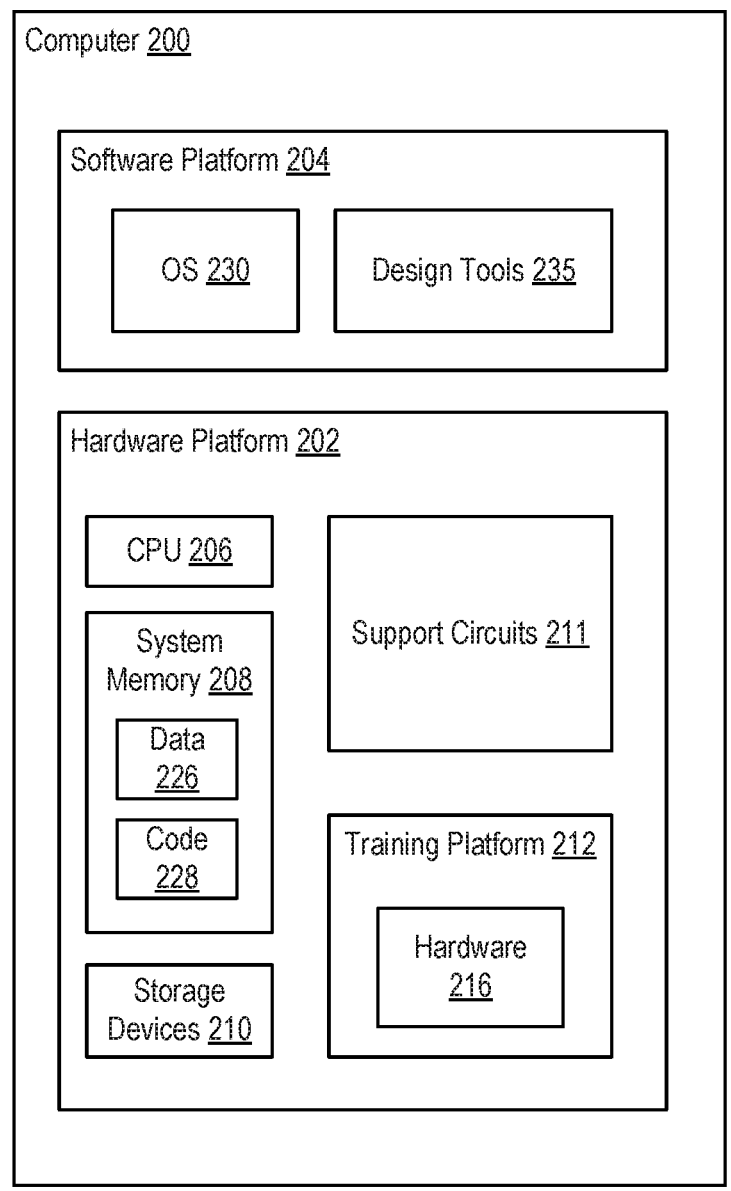
FIG. 2 is a block diagram depicting a computing system ("computer") according to an example.

FIG. 2 is a block diagram depicting a computing system ("computer 200") according to an example. The computer 200 includes a software platform 204 executing on a hardware platform 202. The hardware platform 202 includes a central processing unit (CPU) 206, a system memory 208, storage devices 210, support circuits 211, and a training platform 212. The software platform 204 includes an operating system (OS) 230 and design tools 235.

The CPU 206 can be any type of general-purpose central processing unit (CPU), such as an x86-based processor, ARM®-based processor, or the like. The CPU 206 can include one or more cores and associated circuitry (e.g., cache memories, memory management units (MMUs), interrupt controllers, etc.). The CPU 206 is configured to execute program code that perform one or more operations described herein and which can be stored in the system memory 208 and/or the storage devices 210. The support circuits 211 include various devices that cooperate with the CPU 206 to manage data flow between the CPU 206, the system memory 208, the storage devices 210, the training platform 212, the hardware accelerator 214, or any other peripheral device. For example, the support circuits 211 can include a chipset (e.g., a north bridge, south bridge, platform host controller, etc.), voltage regulators, firmware (e.g., a BIOS), and the like. In some examples, the CPU 206 can be a System-in-Package (SiP), System-on-Chip (SoC), or the like, which absorbs all or a substantial portion of the functionality of the chipset (e.g., north bridge, south bridge, etc.).

The system memory 208 is a device allowing information, such as executable instructions and data, to be stored and retrieved. The system memory 208 can include, for example, one or more random access memory (RAM) modules, such as double-data rate (DDR) dynamic RAM (DRAM). The system memory 208 can store data 226 and program code ("code 228") processed and executed by the CPU 206 to implement the software platform 204. The storage devices 210 includes local storage devices (e.g., one or more hard disks, flash memory modules, solid state disks, and optical disks) and/or a storage interface that enables the computer 200 to communicate with one or more network data storage systems. The hardware platform 202 can include various other conventional devices and peripherals of a computing system, such as graphics cards, universal serial bus (USB) interfaces, and the like.

The training platform 212 includes hardware 216, which can include processor(s), memory, input/output (IO) circuits, and the like. In an example, hardware 216 includes a graphics processing unit (GPU) and associated support circuitry. In another example, hardware 216 can include an application specific integrated circuit (ASIC), programmable IC, or the like along with associated support circuitry. In an example, training platform 212 is more performant than the hardware accelerator 122, but also consumes more energy than the hardware accelerator 122. The training platform 212 can be used to train neural networks.

The OS 230 can be any commodity operating system known in the art, such as such as Linux®, Microsoft Windows®, Mac OS®, or the like. The design tools 235 include software that trains neural networks on the training platform 212 and implements neural networks for target programmable devices.

Figure 3:
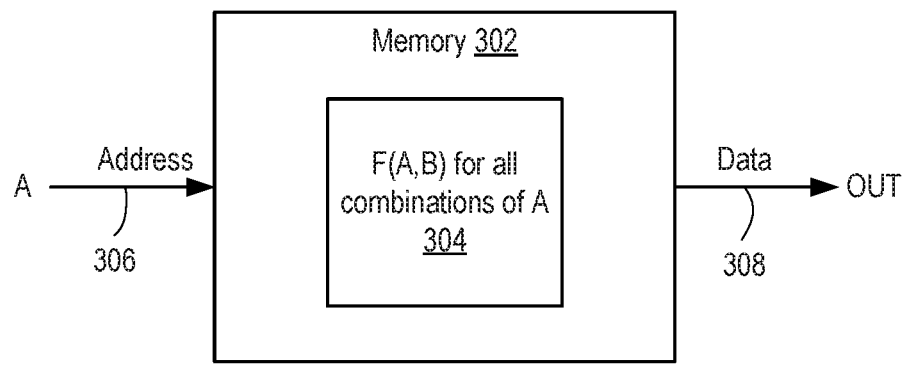
FIG. 3 is a block diagram depicting a pre-compute circuit for implementing a neuron in a neural network within a programmable device according to an example.

As discussed above, deep neural networks are compute intensive. QNNs reduce the compute/memory requirements with comparable accuracy. FIG. 3 is a block diagram depicting a pre-compute circuit 300 for implementing a neuron in a neural network within a programmable device according to an example. The pre-compute circuit 300 includes a memory 302 having an address input 306 (A) and a data output 308 (OUT). The pre-compute circuit 300 converts MAC operations into memory lookup operations. The memory 302 stores data 304, which includes F(A,B) for all combinations of A (where B is fixed).

For example, consider A is a vector of size five, where each element is binary (e.g., 1-bit input elements). Consider B is a vector of size 5, where each element is an 8-bit integer (e.g., 8-bit integer weights). Consider a neuron in a neural network that computes $F(A,B)=\Sigma A_i*B_i$, where i in the index of the vectors (e.g., between 0 and 4 for vectors of size five). A traditional MAC circuit can implement this neuron using five multiplications and four additions. However, in the pre-compute circuit 300, the memory 302 stores 2^5 possible values of F(A,B) as the data 304. That is, the memory 302 stores data for all possible input samples A with a fixed set of weights B. The MAC operation then becomes a memory read operation. In an example, the memory 302 is implemented using one or more lookup tables (LUTs) in a programmable device. In another example, the memory 302 is implemented using one or more random access memories (RAMs) in a programmable device.

Figure 4:
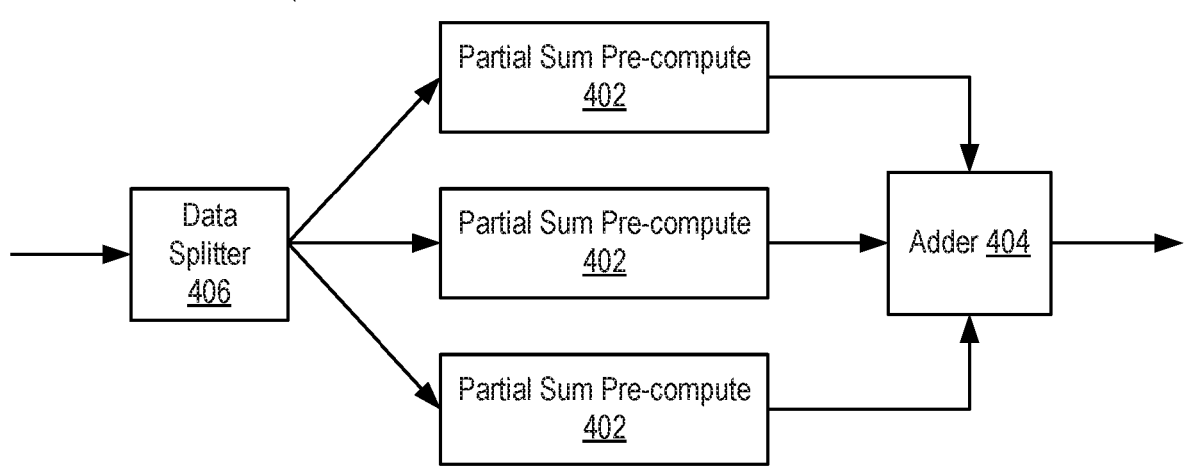
FIG. 4 is a block diagram of a pre-compute circuit according to another example.

FIG. 4 is a block diagram of a pre-compute circuit 400 according to another example. The pre-compute circuit 400 includes a data splitter 406, a plurality of partial sum pre-compute circuits 402, and an adder 404. In this example, the input vector is split input multiple sub-groups, one group for each of the partial sum pre-compute circuits 402. The data splitter 406 divides the input data input the sub-groups, where each sub-group is provided as input to a respective one of the partial sum pre-compute circuits 402. Each pre-compute circuit 402 comprises a pre-compute circuit 300 shown in FIG. 3 (e.g., a memory lookup implementation of a MAC operation). The outputs of the partial sum pre-compute circuits are coupled to inputs of the adder 404, which computes the sum of the outputs. In this manner, a larger input vector can be used without the need for a corresponding larger sized memory. Rather, multiple smaller memories can be used in multiple partial sum pre-compute circuits 402.

The optimal grouping of inputs depends on the size of the weights and the width of the output. For a given weight size (W) and number of input sub-groups (N), the output width is:

$$S_O = \text{roundup}(\log_2((2^W-1)*(2^M-1)*N+1))$$

The number of LUTs needed per sub-group can be expressed as:

$$K = \begin{cases} \text{roundup}\left(\frac{S_0}{2}\right) & 2^{N+M} \leq 32 \\ \text{roundup}\left(\frac{2^{N+M}}{64}\right)*S_0 & 2^{N+M} > 32 \end{cases}$$

For input size F, the total LUT count is $$T=K*F/N$$

In this manner, a user can determine N for the minimum total LUT count T given a weight size W.

Figure 5:
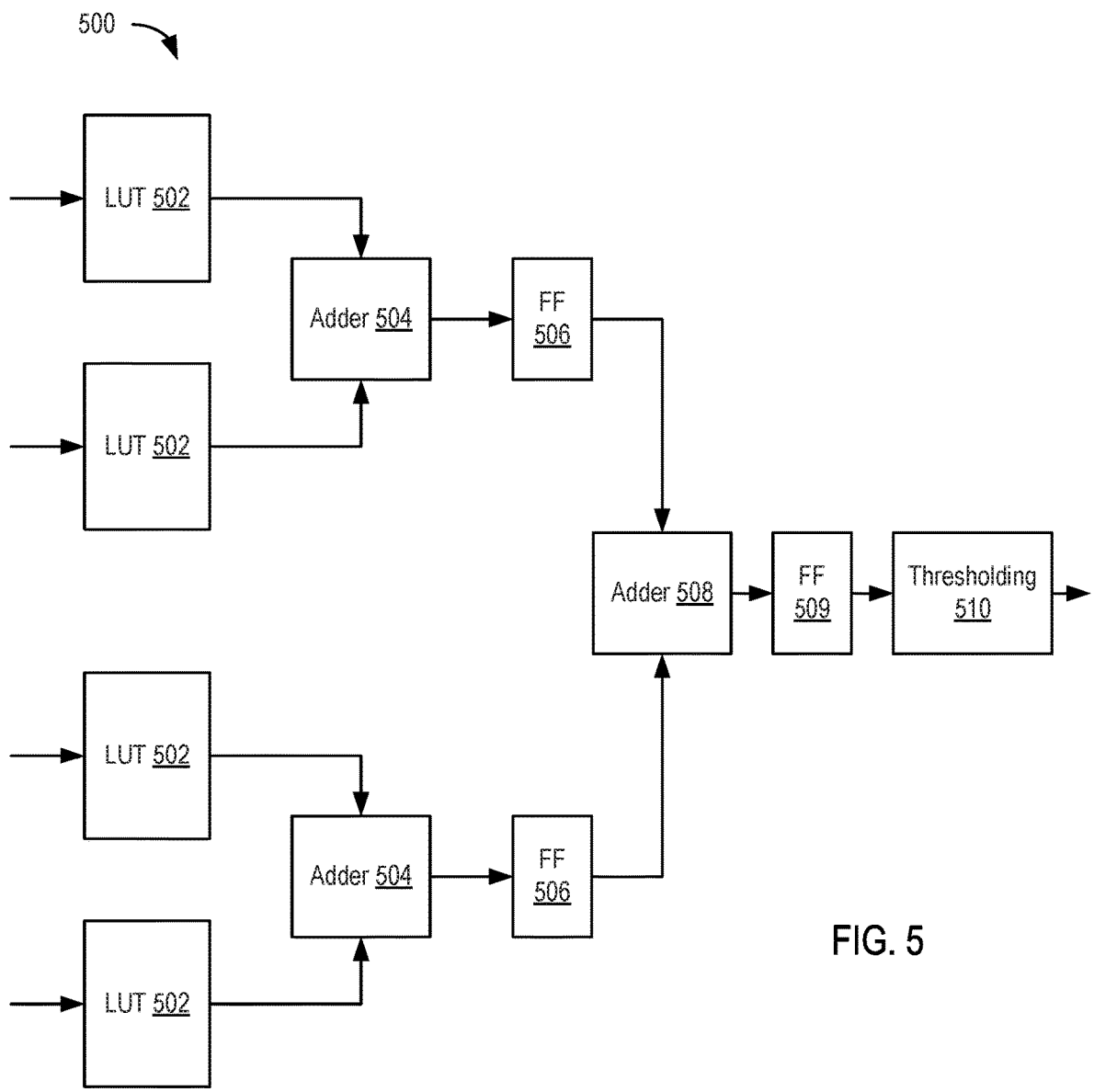
FIG. 5 is a block diagram depicting a pre-compute circuit constructed using LUTs according to an example.

FIG. 5 is a block diagram depicting a pre-compute circuit 500 constructed using LUTs according to an example. The pre-compute circuit 500 includes a plurality of LUTs 502, adders 504, flip-flops 506, an adder 508, a flip-flop 509, and a thresholding circuit 510. In the example shown, the pre-compute circuit 500 includes two pairs of LUTs 502. However, in general, the pre-compute circuit 500 can include more than two pairs of LUTs 502. Each pair of LUTs 502 has an output coupled to an adder 504. The output of each adder 504 is coupled to a flip-flop 506. The outputs of each pair of flip-flops 506 (e.g., there is only one pair of flip-flops 506 shown in the example) is coupled to an adder 508 (e.g., in the example, there is only one adder 508). As can be seen, if there were more than two pairs of LUTs 502, there would be additional numbers of adders 504 (e.g., one for each pair of LUTs 502), and additional numbers of flip-flops 506 (e.g., one for each adder 504). Further, there would be additional adders 508 (e.g., one for each pair of flip-flops 506), and additional flip-flops 509 (e.g., one for each adder 508). If there were more than one flip-flop 509, then the pre-compute circuit 500 can include additional adders (not shown in this example) and additional flip-flops (not shown in this example). The output of the adder 508 is coupled to an input of the flip-flop 509. The output of the flip-flop 509 is coupled to an input of the thresholding circuit 510.

In operation, the pre-compute circuit 500 functions as the basic building block. Each LUT stores partial pre-computed values. The pre-compute circuit 500 includes a multi-stage adder pipeline leading to a thresholding circuit 510. The thresholding circuit outputs one or another state depending on whether the input satisfies or does not satisfy the threshold. The implementation in FIG. 5 works well to implement full networks on larger programmable devices. However, the size of the pre-compute circuit can be larger than that which would fit in a smaller programmable device. Hence, the structure shown in FIG. 6 described below can be used for such smaller programmable devices.

Figure 6:
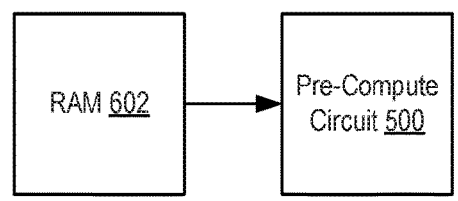
FIG. 6 is a block diagram depicting a pre-compute circuit constructed using LUTs and RAMs according to another example.

FIG. 6 is a block diagram depicting a pre-compute circuit 500 constructed using LUTs and RAMs according to another example. In the present example, the inputs of the LUTs 502 in the pre-compute circuit 500 are coupled to outputs of a RAM 602. The RAM 602 can be implemented using one or more BRAMs in the programmable IC. In operation, pre-computed values are stored in the RAM 602. The pre-computed values are then loaded to the LUTs 502 over several cycles and several computations are performed. This provides for neuron folding, where the same pre-compute circuit 500 is used to perform multiple computations on multiple sets of pre-computed values. The implementation in FIG. 6 functions well for convolutional neural networks.

Figure 8:
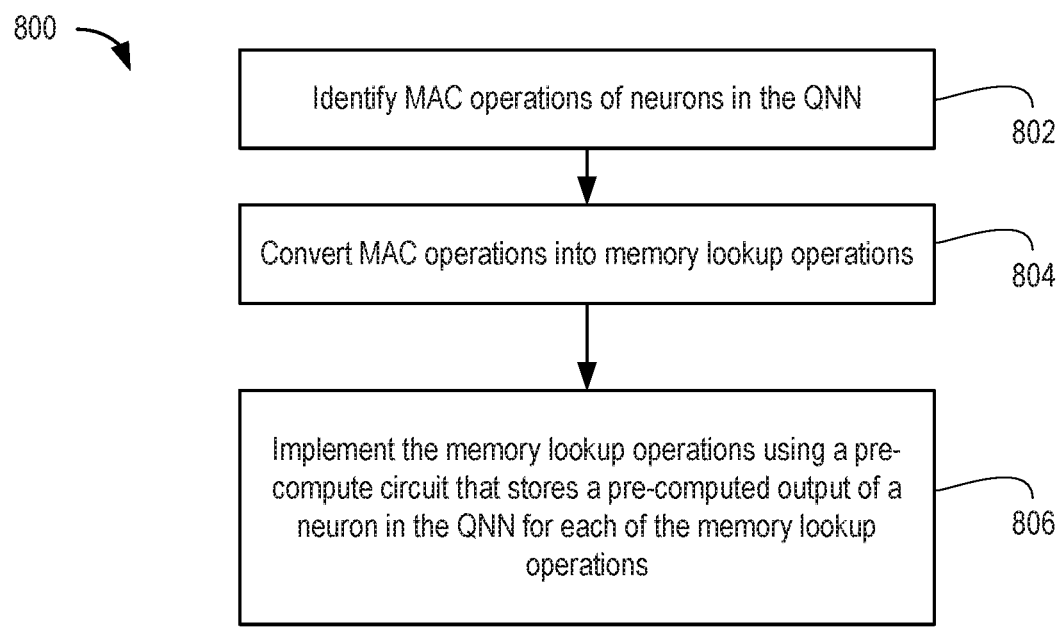
FIG. 8 is a flow diagram depicting a method of implementing a QNN for a programmable device according to an example.

FIG. 8 is a flow diagram depicting a method 800 of implementing a QNN for a programmable device according to an example. The method 800 can be executed by the design tools 235 in the computer 200 described above. The method 800 begins at step 802, where the design tools 235 identify multiply-accumulate operations of neurons in the QNN. For example, a neuron in a QNN can compute $F(A,B)=\Sigma A_i*B_i$, where i in the index of the vectors. The design tools 235 processes the QNN to identify the neurons and corresponding multiply-accumulate operations. At step 804, the design tools 235 convert the multiply-accumulate operations to memory lookup operations. At step 806, the design tools 235 implement the memory lookup operations using a pre-compute circuit for the programmable device. The pre-compute circuit stores a pre-computed output of a neuron in the QNN for each of the memory lookup operations.

The memory lookup operations depend on the structure of the pre-compute circuit, where several examples are provided above. In an example, the pre-compute circuit comprises a random access memory, such as shown in FIG. 3. In another example, the pre-compute circuit comprises a data splitter, a plurality of partial sum pre-compute circuits, and an adder, such as shown in FIG. 4. Each of the plurality of partial sum pre-compute circuits can include first and second pairs of lookup tables (LUTs), first and second adders respectively coupled to outputs of the first and second pairs of LUTs, first and second flip-flops respectively coupled to outputs of the first and second adders, a third adder coupled to outputs of the first and second flip-flops, a third flip-flop coupled to an output of the third adder, and a thresholding circuit coupled to an output of the third flip-flop. Such a configuration is shown in FIG. 5. In an example, the pre-compute circuit includes a RAM coupled to inputs of the first and second pairs of LUTs, such as shown in FIG. 6. The RAM can include one or more BRAMS in the programmable device. In an example, the programmable device comprises a field programmable gate array (FPGA).

Figure 7A:
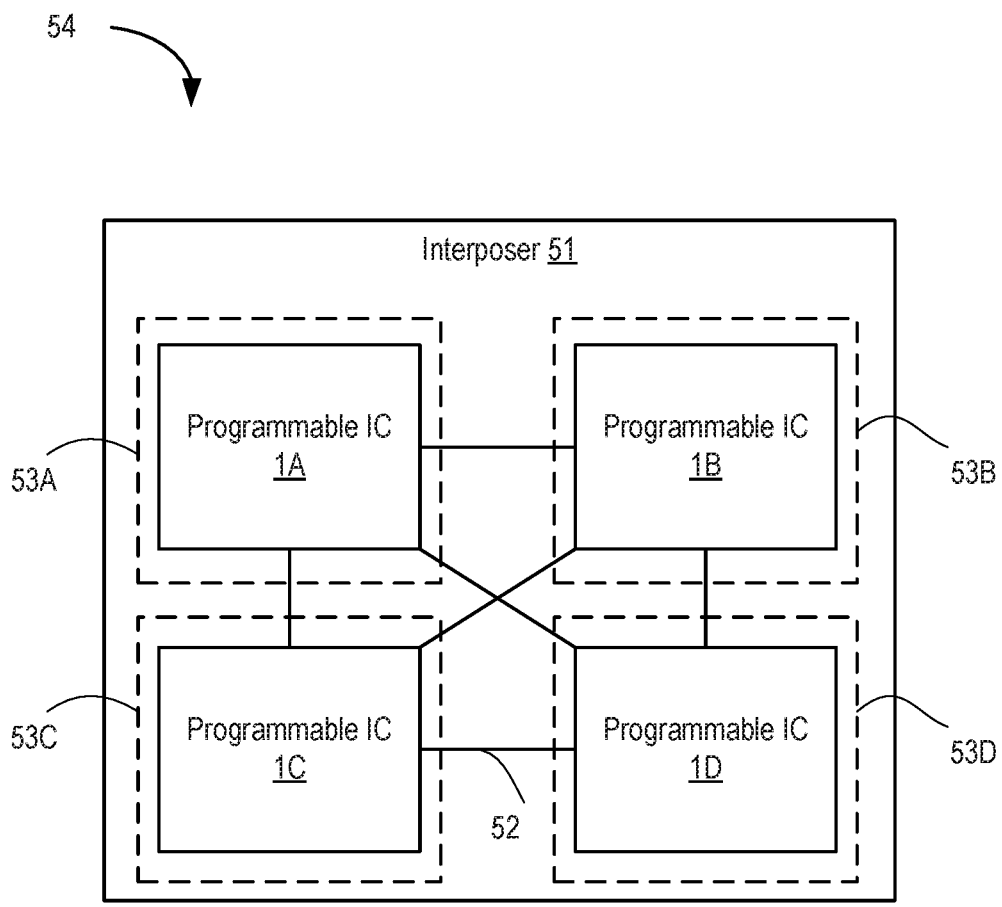
FIG. 7A is a block diagram depicting a multi-integrated circuit (IC) programmable device according to an example.

FIG. 7A is a block diagram depicting a programmable device 54 according to an example. The programmable device 54 can be used to implement the programmable device 128 in the hardware accelerator 122. The programmable device 54 includes a plurality of programmable integrated circuits (ICs) 1, e.g., programmable ICs 1A, 1B, 1C, and 1D. In an example, each programmable IC 1 is an IC die disposed on an interposer 51. Each programmable IC 1 comprises a super logic region (SLR) 53 of the programmable device 54, e.g., SLRs 53A, 53B, 53C, and 53D. The programmable ICs 1 are interconnected through conductors on the interposer 51 (referred to as super long lines (SLLs) 52).

Figure 7B:
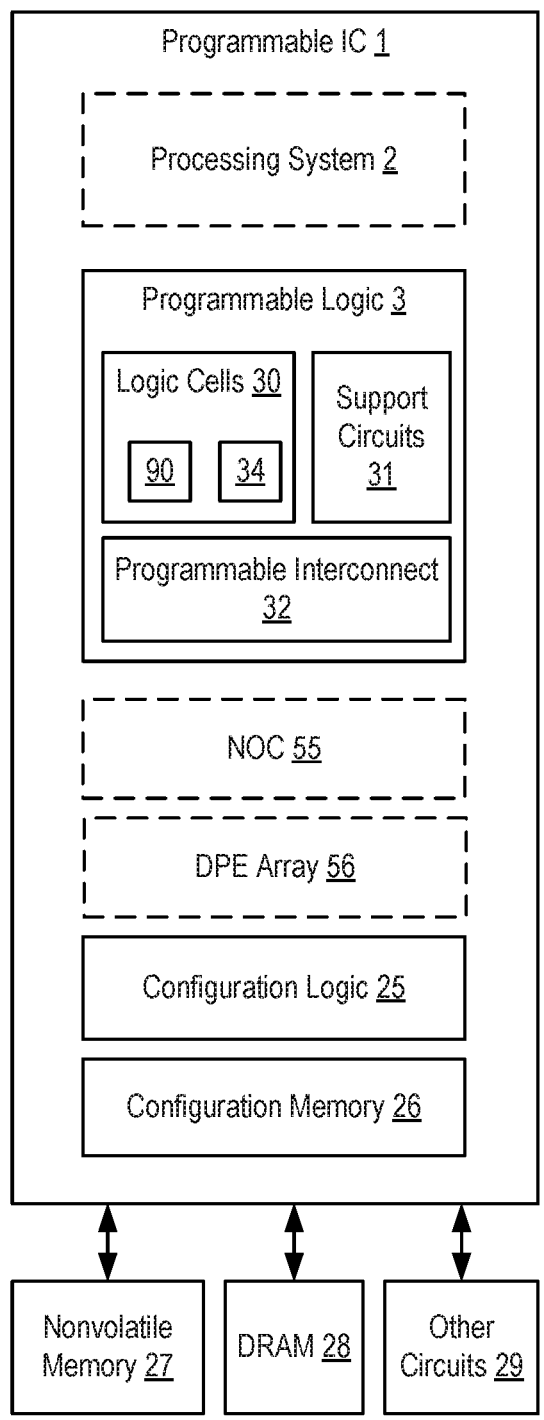
FIG. 7B is a block diagram depicting a programmable IC according to an example.

FIG. 7B is a block diagram depicting a programmable IC 1 according to an example. The programmable IC 1 can be used to implement the programmable device 128 or one of the programmable ICs 1A-1D in the programmable device 54. The programmable IC 1 includes programmable logic 3 (also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. In an example, the logic cells 30 include lookup tables 90 and BRAMS 34. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like. In some examples, the programmable IC 1 includes a network-on-chip (NOC) 55 and data processing engine (DPE) array 56. The NOC 55 is configured to provide for communication between subsystems of the programmable IC 1, such as between the PS 2, the PL 3, and the DPE array 56. The DPE array 56 can include an array of DPE's configured to perform data processing, such as an array of vector processors.

Figure 7C:
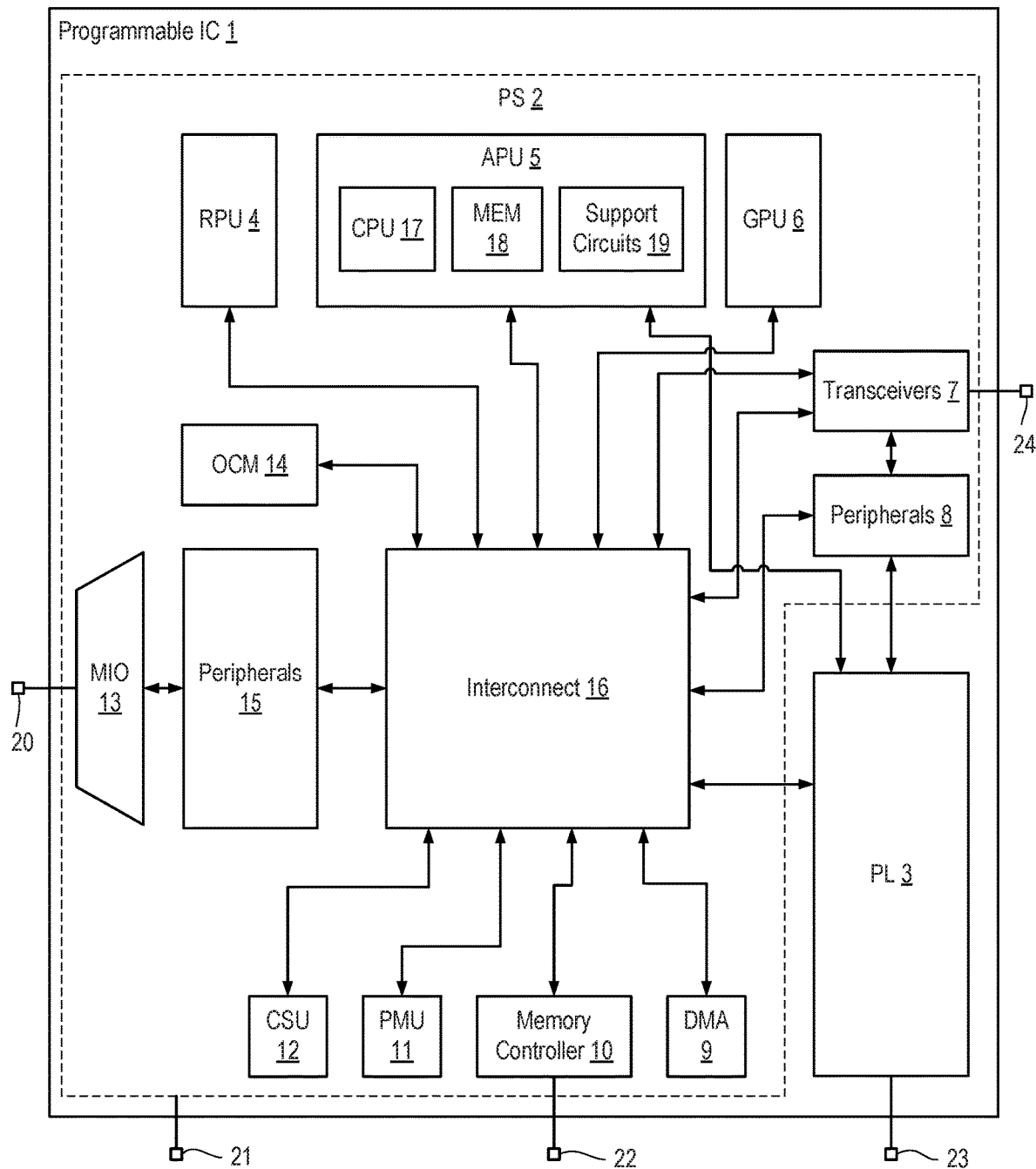
FIG. 7C is a block diagram depicting a System-on-Chip (SOC) implementation of a programmable IC according to an example.

FIG. 7C is a block diagram depicting an SOC implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 11, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 7C, the programmable IC 1 can be used in the hardware accelerator 122 and can function as described above. The acceleration circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, multi-gigabit transceivers (MGTs), and the like.

Figure 7D:
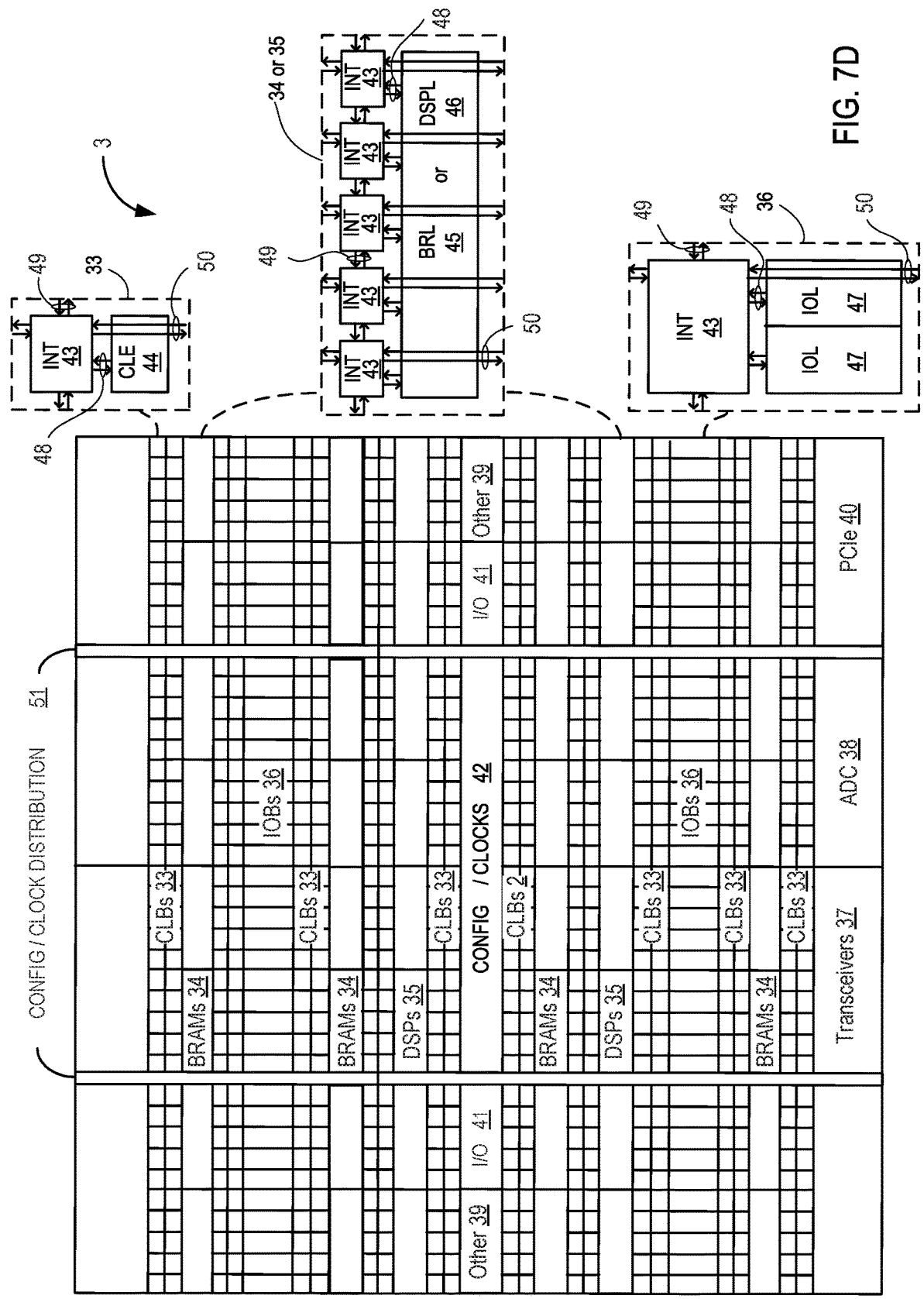
FIG. 7D illustrates a field programmable gate array (FPGA) implementation of a programmable IC according to an example.

FIG. 7D illustrates a field programmable gate array (FPGA) implementation of the programmable IC 1 that includes the PL 3. The PL 3 shown in FIG. 6D can be used in any example of the programmable devices described herein. The PL 3 includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The PL 3 can also include PCIe interfaces 40, analog-to-digital converters (ADC) 38, and the like.

In some PLs, each programmable tile can include at least one programmable interconnect element ("INT") 43 having connections to input and output terminals 48 of a programmable logic element within the same tile, as shown by examples included at the top of FIG. 6D. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 3D) is used for configuration, clock, and other control logic. Vertical columns 51 extending from this horizontal area or column are used to distribute the clocks and configuration signals across the breadth of the PL.

Some PLs utilizing the architecture illustrated in FIG. 7D include additional logic blocks that disrupt the regular columnar structure making up a large part of the PL. The additional logic blocks can be programmable blocks and/or dedicated logic. Note that FIG. 7D is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 7D are purely exemplary. For example, in an actual PL more than one adjacent row of CLBs is typically included wherever the CLBs appear, to facilitate the efficient implementation of user logic, but the number of adjacent CLB rows varies with the overall size of the PL.

While the foregoing is directed to specific examples, other and further examples may be devised without departing from the basic scope thereof, and the scope thereof is determined by the claims that follow.

What is claimed is:

1. A method of implementing a quantized neural network (QNN) for a programmable device, comprising:
    identifying multiply-accumulate operations of neurons in the QNN;
    converting the multiply-accumulate operations to memory lookup operations; and
    implementing the memory lookup operations using a pre-compute circuit for the programmable device, the pre-compute circuit storing a pre-computed output of a neuron in the QNN for each of the memory lookup operations, wherein the pre-compute circuit comprises a random access memory.

2. A method of implementing a quantized neural network (QNN) for a programmable device, comprising:
    identifying multiply-accumulate operations of neurons in the QNN;
    converting the multiply-accumulate operations to memory lookup operations; and
    implementing the memory lookup operations using a pre-compute circuit for the programmable device, the pre-compute circuit storing a pre-computed output of a neuron in the QNN for each of the memory lookup operations, wherein the pre-compute circuit comprises:
        a data splitter;
        a plurality of partial sum pre-compute circuits; and
        an adder.

3. The method of claim 2, wherein each of the plurality of partial sum pre-compute circuits comprises:
    first and second pairs of lookup tables (LUTs);
    first and second adders respectively coupled to outputs of the first and second pairs of LUTs;
    first and second flip-flops respectively coupled to outputs of the first and second adders;

a third adder coupled to outputs of the first and second flip-flops;
a third flip-flop coupled to an output of the third adder; and
a thresholding circuit coupled to an output of the third flip-flop.

4. The method of claim 3, further comprising:
a random access memory (RAM) coupled to inputs of the first and second pairs of LUTs.

5. The method of claim 4, wherein the RAM comprises one or more block RAMS in the programmable device.

6. The method of claim 1, therein the programmable device comprises a field programmable gate array (FPGA).

7. A non-transitory computer readable medium having instructions stored thereon that when executed by a processor cause the processor to perform a method of implementing a quantized neural network (QNN) for a programmable device, comprising:
identifying multiply-accumulate operations of neurons in the QNN;
converting the multiply-accumulate operations to memory lookup operations; and
implementing the memory lookup operations using a pre-compute circuit for the programmable device, the pre-compute circuit storing a pre-computed output of a neuron in the QNN for each of the memory lookup operations, wherein the pre-compute circuit comprises a random access memory.

8. A non-transitory computer readable medium having instructions stored thereon that when executed by a processor cause the processor to perform a method of implementing a quantized neural network (QNN) for a programmable device, comprising:
identifying multiply-accumulate operations of neurons in the QNN;
converting the multiply-accumulate operations to memory lookup operations; and
implementing the memory lookup operations using a pre-compute circuit for the programmable device, the pre-compute circuit storing a pre-computed output of a neuron in the QNN for each of the memory lookup operations, wherein the pre-compute circuit comprises:
a data splitter;
a plurality of partial sum pre-compute circuits; and
an adder.

9. The non-transitory computer readable medium of claim 8, wherein each of the plurality of partial sum pre-compute circuits comprises:
first and second pairs of lookup tables (LUTs);
first and second adders respectively coupled to outputs of the first and second pairs of LUTs;
first and second flip-flops respectively coupled to outputs of the first and second adders;
a third adder coupled to outputs of the first and second flip-flops;
a third flip-flop coupled to an output of the third adder; and
a thresholding circuit coupled to an output of the third flip-flop.

10. The non-transitory computer readable medium of claim 9, further comprising:
a random access memory (RAM) coupled to inputs of the first and second pairs of LUTs.

11. The non-transitory computer readable medium of claim 10, wherein the RAM comprises one or more block RAMS in the programmable device.

12. The non-transitory computer readable medium of claim 7, therein the programmable device comprises a field programmable gate array (FPGA).

13. A computer system, comprising:
a memory configured to store code; and
a processor configured to execute the code stored in the memory to implement a quantized neural network (QNN) for a programmable device by:
identifying multiply-accumulate operations of neurons in the QNN;
converting the multiply-accumulate operations to memory lookup operations; and
implementing the memory lookup operations using a pre-compute circuit for the programmable device, the pre-compute circuit storing a pre-computed output of a neuron in the QNN for each of the memory lookup operations, wherein the pre-compute circuit comprises a random access memory.

14. A computer system, comprising:
a memory configured to store code; and
a processor configured to execute the code stored in the memory to implement a quantized neural network (QNN) for a programmable device by:
identifying multiply-accumulate operations of neurons in the QNN;
converting the multiply-accumulate operations to memory lookup operations; and
implementing the memory lookup operations using a pre-compute circuit for the programmable device, the pre-compute circuit storing a pre-computed output of a neuron in the QNN for each of the memory lookup operations, wherein the pre-compute circuit comprises:
a data splitter;
a plurality of partial sum pre-compute circuits; and
an adder.

15. The computer system of claim 14, wherein each of the plurality of partial sum pre-compute circuits comprises:
first and second pairs of lookup tables (LUTs);
first and second adders respectively coupled to outputs of the first and second pairs of LUTs;
first and second flip-flops respectively coupled to outputs of the first and second adders;
a third adder coupled to outputs of the first and second flip-flops;
a third flip-flop coupled to an output of the third adder; and
a thresholding circuit coupled to an output of the third flip-flop.

16. The computer system of claim 15, further comprising:
a random access memory (RAM) coupled to inputs of the first and second pairs of LUTs.

17. The computer system of claim 16, wherein the RAM comprises one or more block RAMS in the programmable device.

18. The method of claim 1, wherein the pre-compute circuit comprises:
a data splitter;
a plurality of partial sum pre-compute circuits; and
an adder.

19. The method of claim 2, therein the programmable device comprises a field programmable gate array (FPGA).

20. The method of claim 2, wherein the pre-compute circuit comprises a random access memory.

* * * * *